US007264155B2

(12) United States Patent
Halbur et al.

(10) Patent No.: US 7,264,155 B2
(45) Date of Patent: Sep. 4, 2007

(54) STORED-VALUE CARD WITH GAME

(75) Inventors: Ted C. Halbur, Lino Lakes, MN (US); Travis M. Robertson, Minneapolis, MN (US); Amy Lauer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 233 days.

(21) Appl. No.: 11/037,418

(22) Filed: Jan. 18, 2005

(65) Prior Publication Data

US 2006/0157554 A1 Jul. 20, 2006

(51) Int. Cl.
*G06K 5/00* (2006.01)

(52) U.S. Cl. ...................... 235/380; 235/487; 235/381; 273/153 R

(58) Field of Classification Search ................ 235/380, 235/381, 487, 462.01; 273/153 R
See application file for complete search history.

(56) References Cited

U.S. PATENT DOCUMENTS

| | | | | |
|---|---|---|---|---|
| 5,310,184 | A * | 5/1994 | Grist | 273/153 R |
| 5,607,101 | A | 3/1997 | Saito | |
| 5,777,305 | A * | 7/1998 | Smith et al. | 235/380 |
| 5,975,302 | A * | 11/1999 | Young | 206/449 |
| 6,220,917 | B1 * | 4/2001 | Nelson | 446/27 |
| 6,908,358 | B2 | 6/2005 | Lin | |
| 7,055,740 | B1 * | 6/2006 | Schultz et al. | 235/381 |
| 2002/0154137 | A1 | 10/2002 | Ben-David | |
| 2002/0180206 | A1 | 12/2002 | Tronrud | |
| 2006/0163362 | A1 * | 7/2006 | Pallares | 235/487 |

FOREIGN PATENT DOCUMENTS

| | | |
|---|---|---|
| GB | 2 277 482 | 11/1994 |

* cited by examiner

*Primary Examiner*—Steven S. Paik
(74) *Attorney, Agent, or Firm*—Ingrassia Fisher & Lorenz, P.C.

(57) ABSTRACT

A stored-value card including a housing, a game, and an object. The housing includes an account identifier adapted to link the stored-value card to a financial account or a financial record. The game is enclosed within the housing. The object is also enclosed within the housing and placed to selectively interact with the game. The stored-value card is adapted such that manipulation of the housing results in the object moving through at least a portion of the game. Stored-value card assemblies, methods of promoting sales of stored-value cards, methods, of using a stored-value card and other embodiments are also disclosed.

21 Claims, 6 Drawing Sheets

STORED-VALUE CARD WITH GAME

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a stored-value card including a housing, a game, and an object. The housing includes an account identifier adapted to link the stored-value card to a financial account or a financial record. The game is enclosed within the housing. The object is also enclosed within the housing and placed to selectively interact with the game. The stored-value card is adapted such that manipulation of the housing results in the object moving through at least a portion of the game. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services from e.g. a retail store or website. According to one embodiment, an original consumer buys a stored-value card to give a recipient who in turn is able to use the stored-value card at a retail store or setting to pay for the goods and/or services. The stored-value card, according to embodiments of the present invention, provides the consumer and recipient with extra amusement in addition to the ability to pay for goods and/or services with the stored-value card. In particular, the stored-value card presents the original consumer and the recipient with an interactive game or brain teaser in addition to functioning as a stored-value card. In one embodiment, the additional amusing aspect of the stored-value card promotes the sale and/or loading of the stored-value card by potential consumers and/or bearers of the stored-value card.

Figure 1:
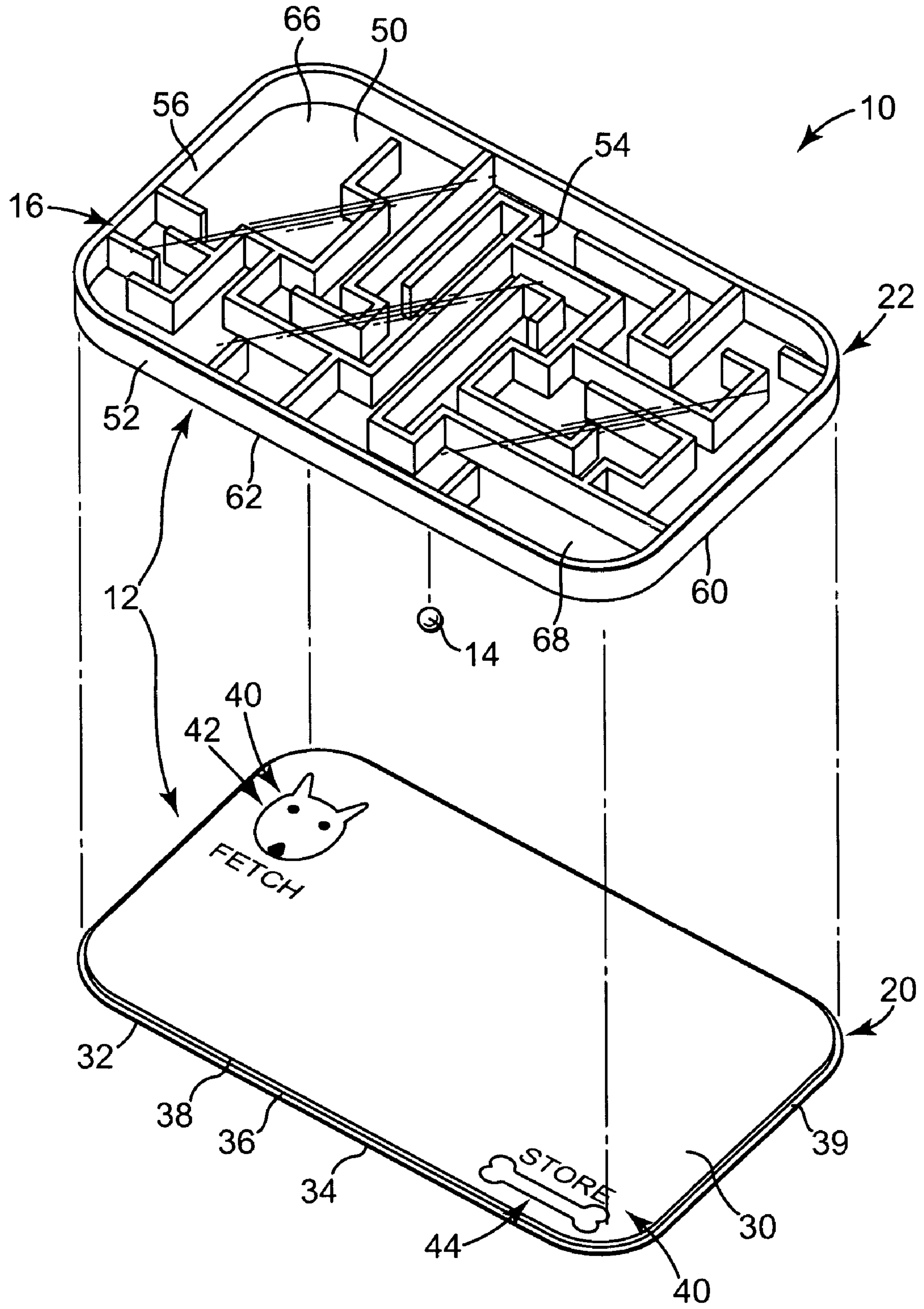
FIG. 1 is an exploded, top perspective view of one embodiment of a stored-value card, according to the present invention.

Turning to the figures, FIG. 1 illustrates an exploded, top perspective view of one embodiment of a stored-value card 10 according to the present invention. The stored-value card 10 includes a housing 12 and a ball 14. Housing 12 defines and/or encloses a maze 16 or other puzzle providing an interactive game and/or brain teaser. Ball 14 is enclosed within housing 12 and is configured to be manipulated by a bearer of stored-value card 10 to move ball 14 through maze 16 to both challenge and amuse the bearer. Housing 12 includes a first housing member 20 and a second housing member 22. In one embodiment, first housing member 20 is a base, and second housing member 22 is a cover.

Figure 2A:
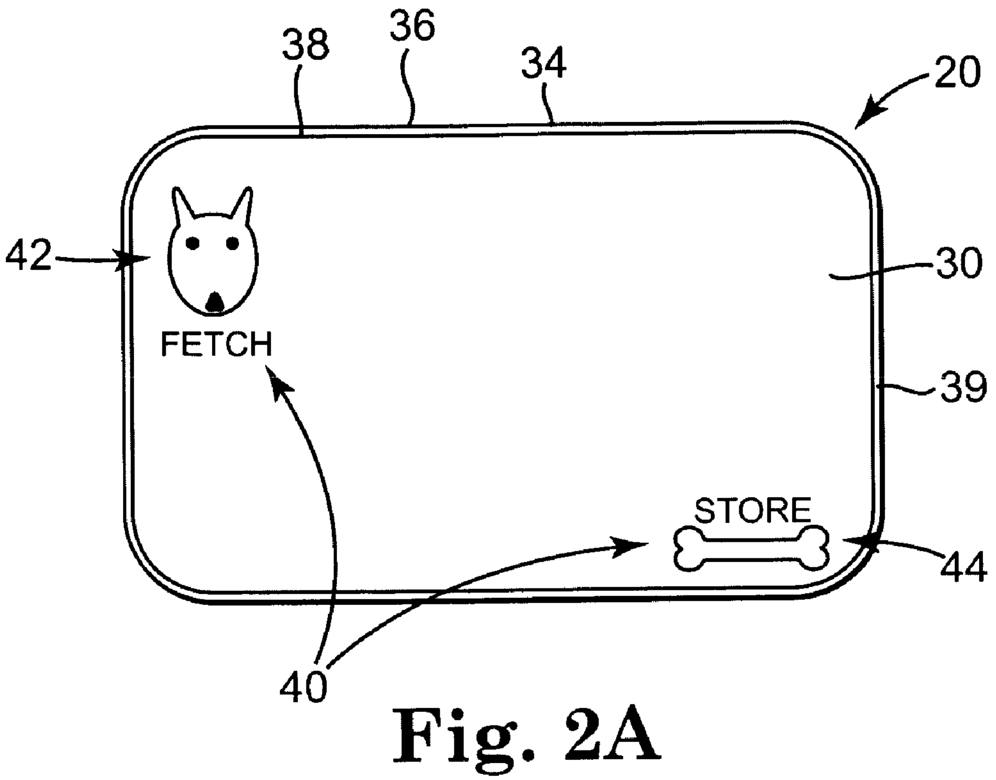
FIG. 2A is a top view of one embodiment of a base of the stored-value card of FIG. 1, according to the present invention.
Figure 2B:
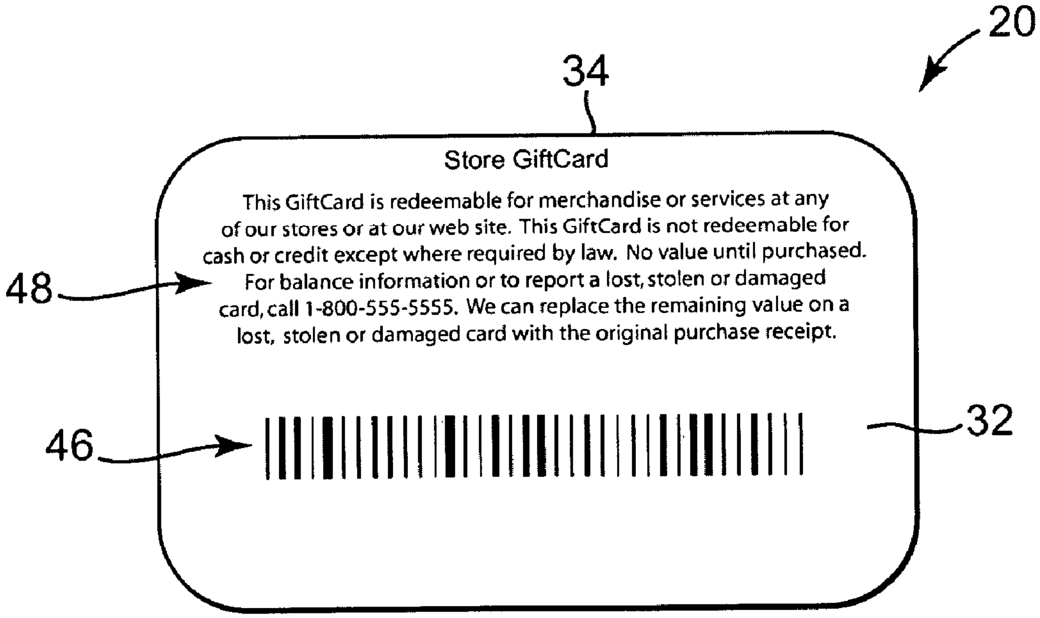
FIG. 2B is a bottom view of one embodiment of the base of FIG. 2A.

One embodiment of base 20 is illustrated in the top and bottom views of FIGS. 2A and 2B, respectively. In one embodiment, base 20 is generally rectangular in shape and is similar in size to an identification card, a credit card, or other card sized to fit in a wallet of a user. Base 20 defines a first or inside generally planar surface 30 and a second or outside generally planar surface 32 opposite inside surface 30. Each surface 30 and 32 is similarly shaped and has a generally similar size. In one embodiment, outside surface 32 is sized slightly larger than inside surface 30. Inside surface 30 is centered with respect to outside surface 32.

An edge 34 extends between inside surface 30 and outside surface 32 around an outer perimeter of each surface 30 and 32. In this manner, in an embodiment where outside surface 32 is slightly larger than inside surface 30, side edge 34 defines a stepped edge including a first portion 36 and a second portion 38. First portion 36 extends from outside surface 32 towards inside surface 30, and second portion 38 extends from inside surface 30 towards outside surface 32. As such, first portion 36 is larger than second portion 38. A ledge 39 extends between portions 36 and 38 with an orientation generally parallel to surfaces 30 and 32. Accordingly, side edge 34 is formed as a stepped edge.

In one embodiment, inside surface 30 includes decorative indicia 40. Decorative indicia 40 relate to one or more of an occasion, a season, a store identifier, brand identifier, media format indicia (e.g. characters, logos, scenes, or other illustrations relating to at least one of a movie, television show, book, video game, etc.), a sport, etc. More particularly, decorative indicia 40 includes first maze end indicia 42 and second maze end indicia 44. Each maze end indicia 42 and 44 is positioned on inside planar surface 30 to correspond with an end, e.g. a start and finish, respectively, of maze 16 upon assembly of stored-value card 10 as illustrated in FIG. 1.

In one embodiment, first maze end indicia 42 and second maze end indicia 44 coordinate or complement one another and promote the idea of moving ball 14 from one end of maze 16 towards the other end of maze 16 as illustrated in FIG. 1. In one example, first maze end indicia 42 depicts a dog and second maze end indicia 44 depicts a bone, to signify a dog chasing after the bone or a bone being given to the dog depending upon the direction ball 14 will be moved through maze 16. In one embodiment, first maze end indicia 42 and second maze end indicia 44 may include wording to encourage the bearer of stored-value card to interact with maze 16, such as "Fetch."

Either the wording, graphic, or other aspects of first maze indicia 42 and/or second maze indicia 44 may serve to associate stored-value card 10 with a product, store, brand, etc. In particular, in one example, the dog may be a mascot of or be otherwise associated with the store honoring stored-value card 10 and/or the wording may include the store name. In this respect, base 20 of stored-value card 10 is configured to be readily associated with the store indicated or referred to by maze end indicia 42 and 44. Although described as a dog and bone with wording, maze end indicia 42 and/or 44 can be any variety of objects, text, scenes, characters, animals, etc. Indicia 42 and 44 and any other indicia on stored-value card 10 provide one example of means for associating stored-value card 10 with at least one of a product, a brand, a store, a holiday, a season, an occasion, and media format indicia. In one embodiment, inside surface 30 further includes a colored background or patterned background extending across at least a portion of inside planar surface 30.

Outside planar surface 32 includes an account identifier 46 such as a barcode, magnetic strip, a smart chip or other electronic device, a radio frequency identification device, or other suitable identifier readily readable by a point-of-sale terminal or other account access station or kiosk. In one embodiment, account identifier 46 is printed on outside planar surface 32 of base 20. Account identifier 46 indicates a financial account or record to which stored-value card 10 is linked. The account or record of the monetary balance on stored-value card 10 optionally is maintained on a database, other electronic or manual record-keeping system, or, in the case of "smart" cards for example, on a chip or other electronics or device on stored-value card 10 itself. Accordingly, by scanning account identifier 46, a financial account or record linked to stored-value card 10 is identified and can subsequently be activated, have amounts debited therefrom, and/or have amounts added or loaded thereto. With the above in mind, account identifier 46 is one example of means for linking stored-value card 10 with a financial account or record and is one example of means for activating or loading value on stored-value card 10.

In one embodiment, redemption indicia 48 are included on outside planar surface 32. Redemption indicia 48 indicate that stored-value card 10 is redeemable for the purchase of goods and/or services and that, upon use, a value of the purchased goods and/or services will be deducted from the financial account or record linked to stored-value card 10. In one embodiment, redemption indicia 48 include phrases such as "<NAME OF STORE>GiftCard" and "this GiftCard is redeemable for merchandise or services at any of our stores or at our website," and/or provides help or phone line information in case of a lost, stolen, or damaged stored-value card, etc. In one embodiment, other indicia are also included on outside planar surface 32 and inside planar surface 30.

In one embodiment, base 20 is formed of a paper material, card stock material, plastic material, e.g. a polycarbonate, or other suitable, relatively rigid material. In one example, base 20 is dual-colored and formed by pressing a first planar sheet of polycarbonate to a second sheet of polycarbonate wherein the first planar sheet is a first color and the second planar sheet is a second color. In one example, the first planar sheet defines first planar surface 30 and the second planar sheet defines second planar surface 32. Other materials and methods of forming base 20 are also contemplated.

Figure 3:
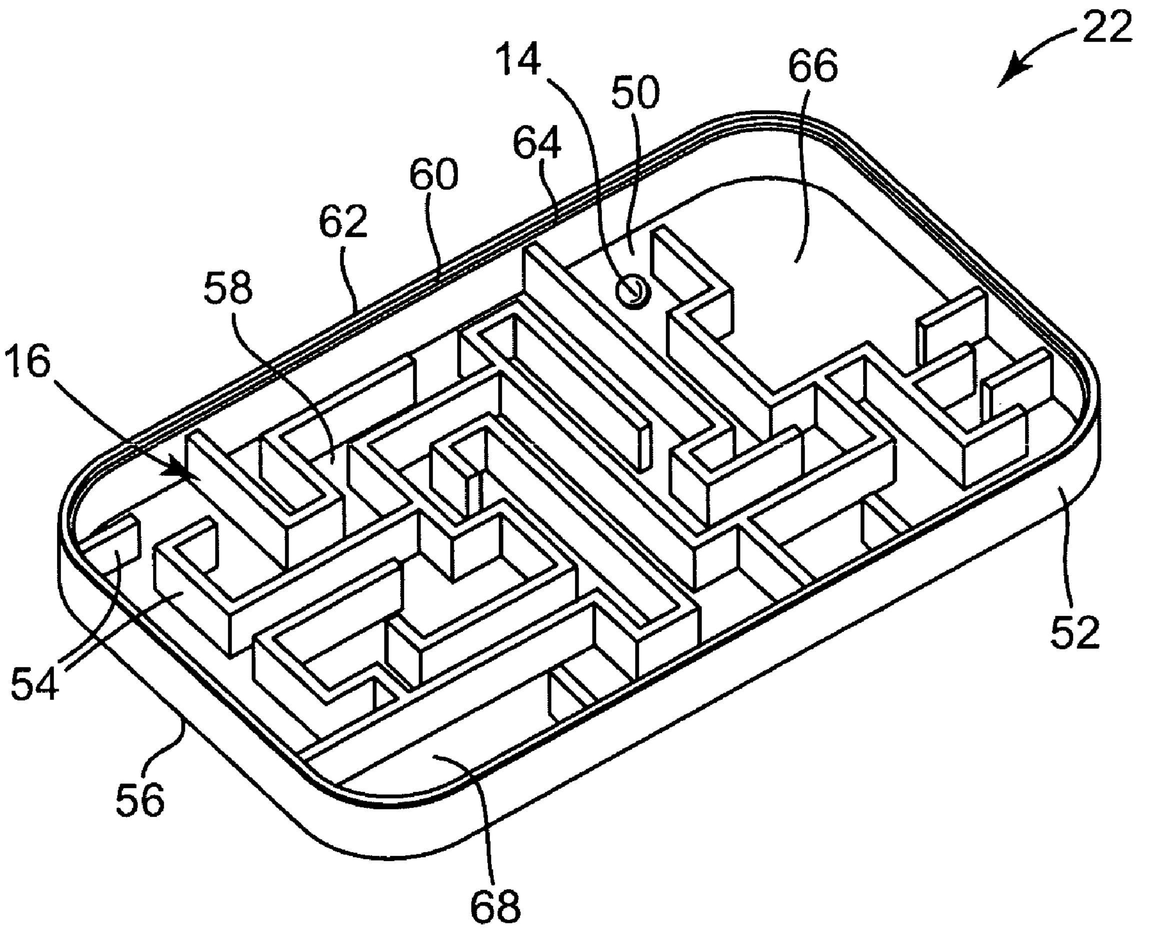
FIG. 3 is a bottom perspective view of one embodiment of a cover of the stored-value card of FIG. 1, according to the present invention.

A bottom, perspective view of one embodiment of cover 22 is illustrated in FIG. 3. Cover 22 generally includes a primary panel 50, a side wall 52, and a plurality of internal walls 54. Primary panel 50 is generally planar and defines an outside surface 56 and an inside surface 58. In one embodiment, primary panel 50 is of a size generally similar to base 20. Side wall 52 extends from inside surface 58 of primary panel 50 and extends generally about the entire perimeter of primary panel 50. For example, side wall 52 extends with a generally perpendicular orientation relative to primary panel 50.

Side wall 52 extends from primary panel 50 to form an edge 60 opposite primary panel 50. In one embodiment, edge 60 is a stepped edge including a first portion 62 and a second portion 64. First portion 62 extends from primary panel 50 a greater distance than second portion 64 extends from primary panel 50. First portion 62 generally extends around the perimeter of second portion 64. In this respect, edge 60 is formed as a stepped edge with higher, first portion 62 wrapping around the outside of lower, second portion 64. In one embodiment, the corners of primary panel 50 and side wall 52 are rounded or chamfered.

The plurality of internal walls 54 generally extend from inside surface 58 away from primary panel 50. More specifically, in one embodiment, each of the plurality of internal walls 54 extends with a generally perpendicular orientation with respect to primary panel 50. The plurality of internal walls 54 are configured to extend from primary panel 50 in an arrangement that collectively defines maze 16. Accordingly, maze 16 generally defines a first end 66 and a second end 68 spaced from one another. In one embodiment, first end 66 indicates a start of maze 16, and the second end 68 indicates a finish of maze 16, or vice versa.

Maze 16 is adapted to receive ball 14 and to allow ball 14 to be manipulated and rolled by a bearer of stored-value card 10 from one end 66 or 68 of maze 16 to the other end 68 or 66. As such, internal walls 54 of maze 16 are positioned to generally allow ball 14 to fit and roll between two generally adjacent and parallel walls 54. More particularly, internal walls 54 of maze 16 are arranged such that there is at least one path through internal walls 54 leading from first end 66 to second end 68. In general, this path is a meandering or non-linear path. In one embodiment, a plurality of internal walls 54 are also included in maze 16 that do not define part of the path between first end 66 and second end 68, but rather define wrong turns, dead ends, etc. as adapted to selectively receive ball 14 and to deter ball 14 from reaching maze end 66 or 68, depending upon which maze end 66 or 68 ball 14 is being moved toward.

In one example, each internal wall 54 extends in either a first direction or a second direction, where the first direction is perpendicular to the second direction. In other embodiments, the plurality of internal walls 54 extend in a variety of angles, and are either linear or curved. Although described herein as being a maze 16, maze 16 may be substituted for by any game, e.g. a puzzle providing an interactive activity or brain teaser. In one example, maze 16 is substituted for by a game where one or more balls 14 are manipulated within housing 12 in attempt to place each ball 14 in a particular hole or cradle within housing 12, etc. Accordingly, maze 16 or another game within housing 12 provides one example of means for guiding ball 14 through maze 16 or other game.

Ball 14 is any generally spherical ball formed of a material sufficiently rigid to avoid deformation upon periodic impact with internal walls 54 and/or primary panel 50 of cover 22, e.g. steel, aluminum, lead, tin, etc. In one embodiment, ball 14 is also formed of a material suitable to reduce or decrease friction between ball 14 and cover 22, to avoid excessively impeding movement of ball 14 through maze 16. In one embodiment, other suitable balls or objects capable of being maneuvered through maze 16 are also contemplated.

Cover 22, or at least primary panel 50, is formed of a translucent or transparent material. In one embodiment, cover 22 is formed of an injection molded plastic or acrylic material. In a particular example, cover 22 is injection molded of a clear acrylic material. Other methods of forming cover 22 and other materials for cover 22 are also contemplated. For example, in one embodiment, internal walls 54 are separately formed and coupled with or positioned beneath the remainder of cover 22.

As illustrated with additional reference to FIG. 1, during assembly, cover 22 is inverted so primary panel 50 is on the bottom of cover 22 as in FIG. 3 and ball 14 is placed within maze 16 of cover 22. Subsequently, base 20 is placed upon cover 22, or vice versa. More specifically, base 20 is placed on cover 22 such that stepped edge 60 of cover 22 interfaces with edge 34 of base 20. In this manner, ledge 39 of base 20 interfaces with first portion 62 of stepped edge 60 on cover 22. Second portion 64 of stepped edge 60 interfaces with inside surface 30 of base 20. The stepped interface between base 20 and cover 22 provides for a generally stable and neat coupling of base 20 and cover 22. In one embodiment, adhesive is applied in areas of interface between base 20 and cover 22, more specifically, between stepped edge 60 of cover 22 and base 20. In one embodiment, when assembled housing 12 has an overall length of about 8.5 cm, an overall width of about 5.5 cm, and an overall thickness of about 0.75 cm.

In this respect, base 20 and cover 22 are secured to one another thereby securing ball 14 within housing 12, more particularly, within maze 16. When base 20 and cover 22 are coupled, in one embodiment, first end 66 of maze 16 generally aligns with first maze end indicia 42 of base 20. Similarly, second end 68 of maze 16 generally aligns with second maze end indicia 44. In this respect, a bearer of stored-value card 10 can view maze 16, ball 14, and maze end indicia 42 and 44 through the generally translucent or transparent primary panel 50 of cover 22.

During use, the bearer of stored-value card 10 can manipulate ball 14 through maze 16, between first and second ends 66 and 68 of maze 16 (i.e. between first and second maze end indicia 42 and 44). In particular, while viewing maze 16 and ball 14 through primary panel 50 of cover 22, the bearer selectively tilts stored-value card 10 to various sides and at various angles to manipulate or roll ball 14 through maze 16 across inside surface 30 of base 20. In one embodiment, by manipulating ball 14 through maze 16, the bearer of stored-value card 10 is amused. In one example, the amusement of manipulating ball 14 through maze 16 entices the bearer of stored-value card 10 as a potential consumer to purchase and/or load stored-value card 10.

Figure 4A:
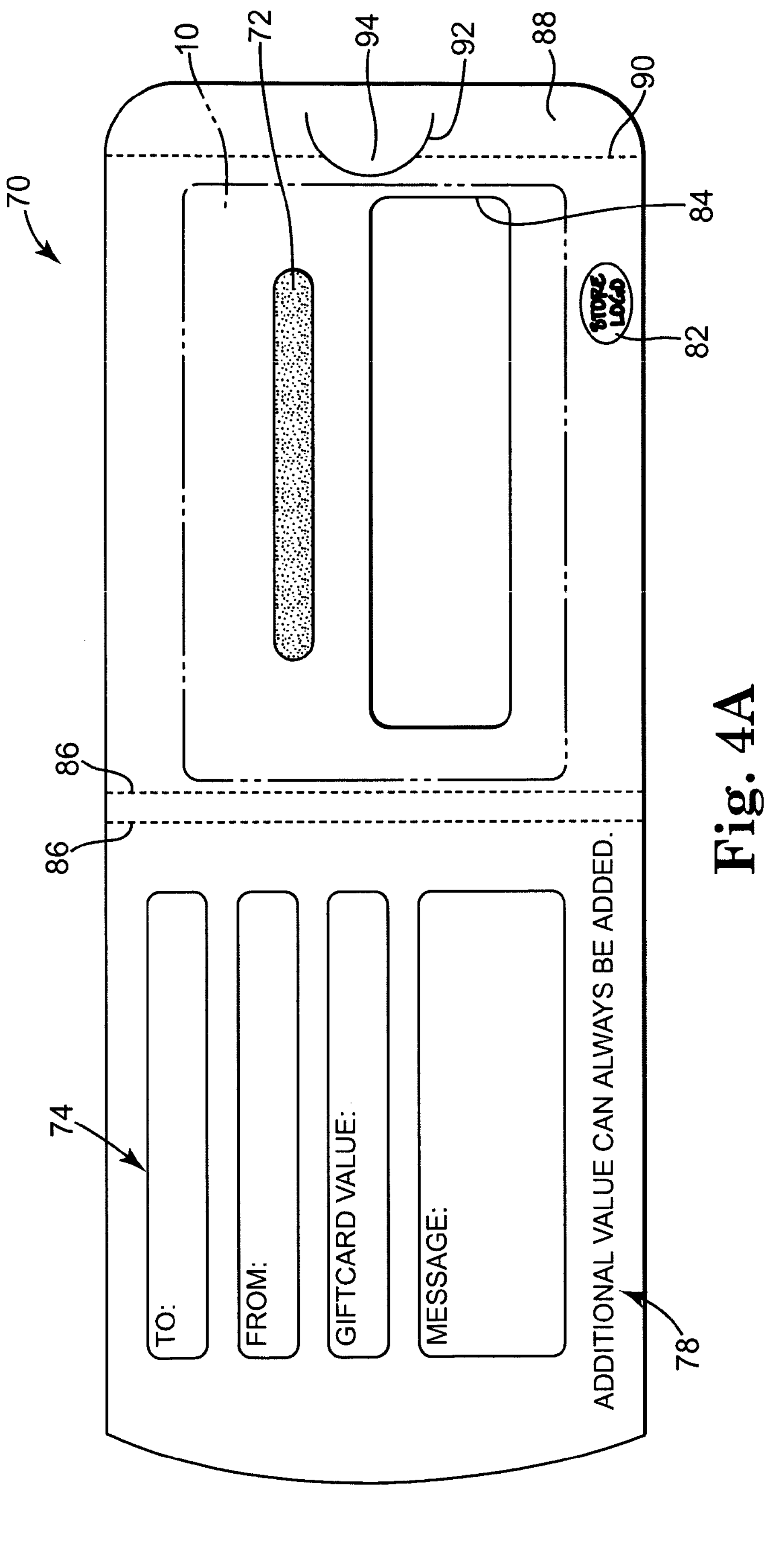
FIG. 4A is a front view of one embodiment of an unfolded carrier for a stored-value card, according to the present invention.
Figure 4B:
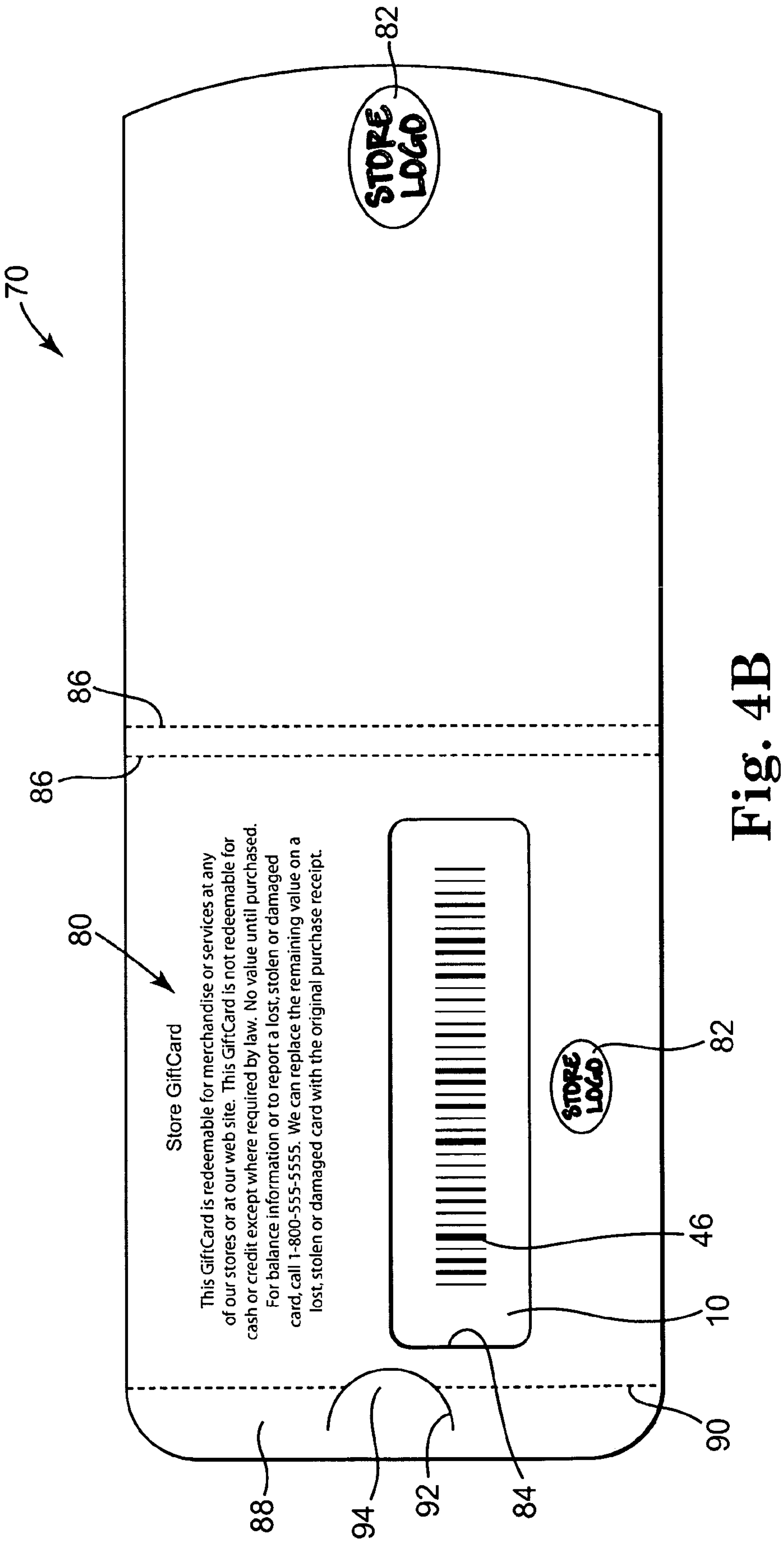
FIG. 4B is a back view of the unfolded carrier of FIG. 4A.

FIGS. 4A and 4B illustrate a carrier or backer 70 for supporting stored-value card 10. Stored-value card 10 is readily releasably attached to backer 70, for example by an adhesive 72 or the like, and is represented in phantom lines in FIG. 4A. Backer 70 comprises a single layer or multiple layers of paper or plastic material, for example, generally in the form of a relatively stiff but bendable/flexible card. Other materials are also contemplated. Backer 70 displays indicia, graphics or text information including store logo(s), store name(s), slogans, advertising, instructions, directions, brand indicia, promotional information, holiday indicia, seasonal indicia, media format identifiers (e.g. characters, logos, scenes, or other illustrations relating to at least one of a movie, television show, book, etc.), characters, and/or other information.

Indicia 74, for example, include to, from, initial gift card value, and message fields. Indicia 78 notify a user and promote that additional value can always be added or reloaded to stored-value card 10. Indicia 80 indicate that stored-value card 10 is redeemable for the purchase of goods and/or services and that, upon use, a value of the purchased goods and/or services will be deducted from the financial account or record linked to stored-value card 10. In one embodiment, indicia 80 include phrases such as "<NAME OF STORE>GiftCard" and "This GiftCard is redeemable for merchandise or services at any of our stores or at our website," and/or provides help or phone line information in case of a lost, stolen, or damaged stored-value card 10, etc. Indicia 82 identify a store, brand, department, etc. and/or services associated with stored-value card 10. Any of indicia 74, 78, 80, 82, or other indicia, optionally may appear anywhere on backer 70 or stored-value card 10. Additional information besides that specifically described and illustrated herein also may be included.

Backer 70 defines a window or opening 84 for displaying account identifier 46 of stored-value card 10 as illustrated in FIG. 4B. As previously described, account identifier 46 is adapted for accessing a financial account or record associated with stored-value card 10 for activating, loading, or debiting from the account or record. Accordingly, window 84 allows access to account identifier 46 to activate and/or load stored-value card 10 without removing stored-value card 10 from backer 70.

In one embodiment, backer 70 is a generally bi-fold substrate defining fold line(s) 86, about which backer 70 is foldable roughly in half. In FIGS. 4A and 4B, backer 70 is unfolded, i.e. is in an open configuration. According to one embodiment, FIG. 4A illustrates surfaces of backer 70 that will be supported on a rack or other fixture to face a customer of a retail store who is considering the purchase of stored-value card 10. In another example, while on display in a retail store, backer 70 is folded back about at least one of fold lines 86 to present only the surfaces of backer 70 illustrated in FIG. 4A and positioned on the same side of fold lines 86 as stored-value card 10 to a consumer. In such an embodiment, indicia 74 and 78 would not be visible to a consumer when backer 70 and stored-value card 10 are placed for display in the retail store. Backer 70 is one example means for removably supporting stored-value card 10 for display in a retail setting.

After purchase, backer 70 is foldable about fold line(s) 86 such that the FIG. 4A surfaces of backer 70 are folded towards each other and stored-value card 10 is enclosed in a compact package formed by folded backer 70. In this manner, the surfaces of backer 70 illustrated in FIG. 4B are disposed toward the outside of the folded, compact package, according to embodiments of the invention. In one embodiment, folded backer 70 effectively wraps stored-value card 10 for presentation from a consumer to a recipient. In one embodiment, fold line(s) 86 are two fold lines slightly spaced from one another to accommodate a thickness of stored-value card 10. Folding in the other direction about fold line(s) 86 for display on a rack in a retail setting, or about other fold line(s) of backer 70, is also contemplated.

In one embodiment, backer 70 optionally includes a tab 88 extending from one edge of backer 70 running parallel to fold lines 86. In one example, an additional fold line 90 runs between tab 88 and the remainder of backer 70. In addition, a generally semi-circular cut 92 is formed from tab 88 through fold line 90 and partially onto the remainder of backer 70. In one embodiment, cut 92 is generally centered upon tab 88 and backer 70. Accordingly, semi-circular cut 92 defines a generally semi-circular flap 94, which can be partially bent away from the remainder of tab 88 and backer 70.

More specifically, upon folding of backer 70 about fold line(s) 86, tab 88 is folded upward about fold line 90 and flap 94 is pulled away from tab 88 to interface with an opposing edge of backer 70. In this respect, the opposing edge of backer 70 can be tucked beneath flap 94 to maintain backer 70 in a folded or closed position (not shown). Backers similar to backer 70 can be used with various sizes and shapes of stored-value card 10. Other backers or packages are also contemplated for supporting stored-value card 10.

Figure 5:
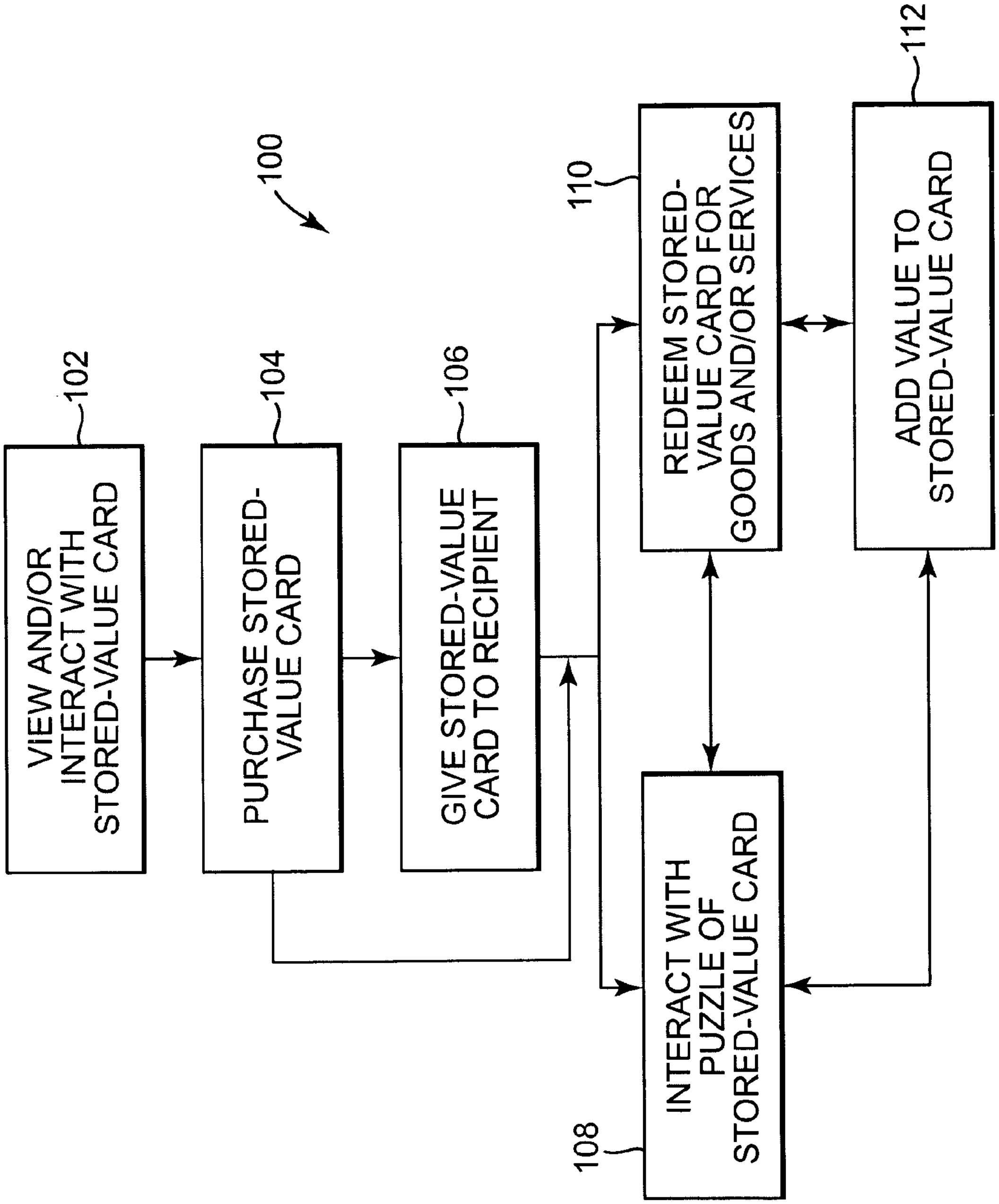
FIG. 5 is a flow chart illustrating one embodiment of a method of using a stored-value card, according to the present invention.

FIG. 5 is a flow chart illustrating one embodiment of a method 100 of using stored-value card 10. At 102, a potential consumer views stored-value card 10, which is displayed in a retail setting. Upon viewing, the potential consumer may also interact with stored-value card 10 to inspect maze 16 and how it works. As such, the viewable maze 16 provides one example of means for engaging a bearer of stored-value card 10 to interact with stored-value card 10. At 104, the consumer, who may have been enticed by maze 16 to purchase stored-value card 10, decides to and does purchase stored-value card 10 from a retail store. At 106, the consumer optionally gives stored-value card 10 to a recipient, such as a graduate, a relative, a friend, expectant parents, one having a recent or impending birthday, a couple having a recent or impending anniversary, etc. As an alternative, the consumer can keep stored-value card 10 for his or her own use.

At 108, the consumer or the recipient, whoever is in current ownership or is the current bearer of stored-value card 10, interacts with maze 16 or other puzzle of stored-value card 10 as described above. At 110, the current bearer of stored-value card 10 redeems stored-value card 10 for goods and/or services from the retail store. At 112, the current bearer of stored-value card 10 adds or loads value to stored-value card 10, more particularly, to the financial account or record associated with stored-value card 10. Upon interacting with maze 16 at 108, redeeming stored-value card 10 at 110, or adding value to stored-value card 10 at 112, the current bearer of stored-value card 10 subsequently can perform any of steps 108, 110, or 112 as desired. In one embodiment, the ability of the current bearer to repeat redeeming stored-value card 10 at 110 is limited by whether the financial account or record associated with stored-value card 10 has any value at the time of redemption.

Although described above as occurring at a single retail store, in one embodiment, purchasing stored-value card 10 at 104, redeeming stored-value card 10 at 110, and adding value to stored-value card 10 at 112, can each be performed at any one of a number of stores adapted to accept stored-value card 10. In one example, the number of stores are each part of a chain of similarly branded stores. In one example, the number of stores includes at least one website and/or at least one conventional brick and mortar structure.

Stored-value cards come in many forms, according to embodiments of the invention. The gift card, like other stored-value cards, can be "re-charged" or "reloaded" at the direction of the original consumer, a gift recipient, or a third party. The term "loading on" or "loaded on" herein should be interpreted to include adding to the balance of a financial account or a financial record associated with the stored-value card. The balance associated with a stored-value card declines as the card is used, encouraging repeat visits. The stored-value card remains in the uses purse or wallet, serving as an advertisement or reminder to re-visit the associated merchant. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value card 10 optionally is a physical card made of plastic, paper, generally stiff paper, other substrate, or the like. Adding value to stored-value card 10 optionally includes an either fixed amount or an amount that can be chosen by the consumer or other user. Other modifications within the scope of the invention in its various embodiments will be apparent to those of ordinary skill.

What is claimed is:

1. A stored-value card comprising:

a housing;

an account identifier immovably included on the housing and adapted to link the stored-value card to a financial account or a financial record;

a game enclosed within the housing; and an object enclosed within the housing and placed to selectively interact with the game;

wherein the stored-value card is adapted such that manipulation of the housing results in the object moving through at least a portion of the game.

2. The stored-value card of claim 1, wherein the housing is at least partially transparent such that the game and object are viewable from a point external to the housing.

3. The stored-value card of claim 1, wherein the game is a maze.

4. The stored-value card of claim 1, wherein the housing includes:

a base; and a cover coupled to the base, wherein the object is housed between the base and the cover.

5. The stored-value card of claim 4, wherein the cover is one of translucent and transparent.

6. The stored-value card of claim 5, wherein the cover includes a plurality of internal walls positioned to define the game.

7. The stored-value card of claim 5, wherein the base includes an inside surface including decorative indicia viewable through the cover of the housing.

8. The stored-value card of claim 7, wherein the decorative indicia include first game end indicia and second game end indicia, and further wherein the first game end indicia is positioned to generally align with a first end of the game, and the second game end indicia is positioned to generally align with a second end of the game.

9. The stored-value card of claim 7, wherein the decorative indicia relate to at least one of a product, a store, a brand, a holiday, a season, an occasion, and media format indicia.

10. The stored-value card of claim 4, wherein the cover and the base are coupled with a stepped interface.

11. The stored-value card of claim 1, wherein the object is a ball.

12. The stored-value card of claim 1, in combination with a backer readily releasably attached to the housing of the stored-value card, wherein the backer is foldable to enclose the stored-value card.

13. A financial transaction card comprising:

a housing;

an object within the housing;

means for linking the financial transaction card with a financial account or a financial record such that the financial transaction card is adapted to pay for at least one of goods and services, wherein the means for linking is included on an outside surface of the housing; and means for manipulating the object to a desired location within the housing.

14. The financial transaction card of claim 13, wherein the object is a ball and the means for manipulating includes means for guiding the ball through a maze.

15. A method of promoting sales of a gift card linked to a financial account or a financial record, the method comprising:

displaying a gift card having an interactive puzzle to a potential consumer, wherein the interactive puzzle is included within a housing and is visible to the potential consumer during display of the gift card;

permitting the potential consumer to handle the gift card to interplay with the interactive puzzle; and informing the potential consumer that the gift card is redeemable for merchandise or services following purchase of the gift card;

wherein displaying the gift card and permitting the potential consumer to handle the gift card collectively entice the potential consumer to purchase the gift card, and wherein the gift card includes an account identifier linking the gift card to the financial account or the financial record, and the account identifier is immovably coupled to the housing.

16. The method of claim 15, wherein the gift card includes a ball adapted to be moved through at least a portion of the interactive puzzle.

17. The method of claim 16, wherein permitting the potential consumer to handle the gift card includes permitting the potential consumer to maneuver the gift card in a manner resulting in movement of the ball through at least a portion of the interactive puzzle.

18. The method of claim 15, wherein the puzzle is a maze.

19. A method of using a card, the method comprising:

providing a card including an account identifier linked to a financial account or a financial record, the card including a housing maintaining a game, wherein the account identifier is included on an outside surface of the housing;

activating the card to permit deductions from the financial account or the financial record;

display indicia encouraging a bearer of the card to interact with the game; and receiving the card as payment for goods or services, the value of the goods or services being deducted from the financial account or the financial record.

20. The method of claim 19, wherein encouraging includes enticing the bearer to manipulate an object through a maze.

21. The method of claim 19, wherein activating the card includes scanning the account identifier on the card through an opening in a package that selectively supports the card.

* * * * *